United States Patent
Lakkimsetti et al.

(10) Patent No.: US 9,762,121 B2
(45) Date of Patent: Sep. 12, 2017

(54) ACCURATE ZERO CURRENT DETECTOR CIRCUIT IN SWITCHING REGULATORS

(71) Applicant: Cirel Systems Private Limited, Bangalore (IN)

(72) Inventors: Leela Madhav Lakkimsetti, Bangalore (IN); Raghavendra Rao Haresamudram, Bangalore (IN); Prasenjit Bhowmik, Bangalore (IN)

(73) Assignee: Cirel Systems Private Limited (IN)

( * ) Notice: Subject to any disclaimer, the term of this patent is extended or adjusted under 35 U.S.C. 154(b) by 265 days.

(21) Appl. No.: 14/456,689

(22) Filed: Aug. 11, 2014

(65) Prior Publication Data

US 2015/0333611 A1 Nov. 19, 2015

(30) Foreign Application Priority Data

May 14, 2014 (IN) .......................... 2397/CHE/2014

(51) Int. Cl.
*H02M 1/00* (2006.01)
*H02M 3/158* (2006.01)
*H02M 3/156* (2006.01)

(52) U.S. Cl.
CPC ............ *H02M 3/156* (2013.01); *H02M 1/00* (2013.01); *H02M 3/158* (2013.01); *H02M 2001/0009* (2013.01)

(58) Field of Classification Search
None
See application file for complete search history.

(56) References Cited

U.S. PATENT DOCUMENTS

| | | | | |
|---|---|---|---|---|
| RE38,940 E | * | 1/2006 | Isham | H02M 3/1588 323/224 |
| 2005/0077884 A1 | * | 4/2005 | Krug | H02M 3/156 323/282 |
| 2008/0238390 A1 | * | 10/2008 | Trivedi | H02M 3/1584 323/283 |
| 2010/0079127 A1 | * | 4/2010 | Grant | H02M 3/156 323/285 |
| 2014/0070781 A1 | * | 3/2014 | Yanagida | G05F 1/10 323/271 |
| 2014/0320094 A1 | * | 10/2014 | Huang | H02M 3/156 323/235 |

OTHER PUBLICATIONS

K.-H. Cheng and Y.-L. Lo, "A fast-lock mixed-mode dll with widerange operation and multiphase outputs," Proc. Design, Automation and Test in Europe, vol. 2, p. 5, 2006.*

* cited by examiner

*Primary Examiner* — Nguyen Tran
*Assistant Examiner* — Monica Mata
(74) *Attorney, Agent, or Firm* — Holland & Hart LLP

(57) ABSTRACT

A switching regulator circuit includes a gate driver circuit driving a first switch and a second switch to generate a first voltage at a first node. Further, the switching regulator includes an LC filter circuit responsive to the first voltage to generate a desired output voltage. Moreover, the switching regulator includes a regulator circuit coupled to the LC filter circuit to control the gate driver circuit. The regulator circuit accurately controls variations in trip point. The trip point is a voltage at which the second switch is switched OFF by the gate control circuit. The regulator circuit includes one of a Delay Locked Loop (DLL) and a Pulse width modulator (PWM) controller.

3 Claims, 7 Drawing Sheets

ACCURATE ZERO CURRENT DETECTOR CIRCUIT IN SWITCHING REGULATORS

PRIORITY

This application claims the priority of Indian Provisional Patent Application No. 2397/CHE/2014 filed on 14 May 2014, the disclosure of which is incorporated herein in its entirety.

FIELD OF THE INVENTION

The present invention generally relates to switching regulator circuit and more specifically to a regulator circuit controlling the variations of a trip point for switching OFF a power switch in the switching regulator circuit. The trip point is an instance when value of an inductor current is at an optimal proximity to zero.

BACKGROUND

DC-DC converters or regulators are implemented in circuits to achieve a desired source voltage. A buck switching regulator is a non-linear DC to DC voltage converter. The buck switching regulator has a pair of Metal Oxide Semiconductor Field Effect Transistors (MOSFETs) having a common switch node. A gate control circuit in the buck switching regulator controls the pair of MOSFETs connected to an LC filter circuit. The gate control circuit controls timing of the pair of MOSFETs to convert an input voltage Vin to an output voltage Vout. A first switch among the pair of MOSFETs generates a pulsated voltage signal. The pulsated voltage signal is filtered by the LC filter circuit to generate the output voltage Vout. A second switch among the pair of MOSFETs is switched ON to provide a conduction path necessary to de-energize an inductor in the LC filter during each switching cycle. Switching OFF the second switch before the inductor is completely de-energized results in energy loss in the buck switching regulator. As a result, a circuit for identifying an instance when the inductor current is zero is necessary. An instance when the inductor current becomes zero is referred to as "trip point". A zero current detector is used to identify the instance at which the inductor current is zero.

Referring to FIG. 1 now, FIG. 1 illustrates an example of an existing buck switching regulator circuit 100 implementing a zero current detect (ZCD) comparator 110. The buck switching regulator 100 includes a controller 105, the ZCD comparator 110, a gate control circuit 115, a first switch 120, a second switch 125, an inductor 130, a capacitor 135, and a load terminal 140. The first switch 120 and the second switch 125 have a common switch node. A first reference voltage $V_{REF1}$ and a switch node voltage SW_OUT is fed to the ZCD comparator 110. The first reference voltage $V_{REF1}$ represents estimated magnitude of the switch node voltage SW_OUT when current through the inductor 130 is zero. A second reference voltage $V_{REF}$ and an output voltage Vout is fed to the controller 105. The controller 105 controls duty cycle of the buck switching regulator 100. The output voltage Vout is proportional to the duty cycle of the buck switching regulator 100.

The working of the buck switching regulator 100 in FIG. 1 is explained with reference to voltage signal graphs depicted in FIG. 2. FIG. 2 depicts variation in the output of the ZCD comparator 110 based on the switch node voltage SW_OUT. The gate control circuit 115 supplies a PON signal to a gate terminal of the first switch 120. The gate control circuit 115 supplies an NON signal to a gate terminal of the second switch 125. The variations of the PON signal and the NON signal with time is depicted in FIG. 2. The PON signal goes to the HIGH state at a first instance t1. The PON signal switches on the first switch 120 at the first instance t1. The first switch 120 provides a low resistance conduction path from supply voltage Vdd to the inductor 130. The switch node voltage SW_OUT signal rises to the supply voltage Vdd at the first instance t1. The gate control circuit 115 lowers the PON signal to a LOW state at a second instance t2. The PON signal hence switches OFF the first switch 120. The first switch 120 breaks the low resistance conduction path from the supply voltage Vdd to the inductor 130. The inductor 130 resists the abrupt change in current and forward biases a parasitic diode in the second switch 125 and hence the switch node voltage SW_OUT signal drops to negative value of forward bias voltage of the parasitic diode.

The gate control circuit 115 shifts the NON signal to HIGH state at a third instance t3. Time elapsed between the second instance t2 and the third instance t3 is called non-overlap period. The non-overlap period prevents the formation of a short circuit through the first switch 120 and the second switch 125. The second switch 125 provides a conduction path from the inductor 130 to ground. At the third instance t3, the inductor current flows through the second switch 125 to ground de-energizing the inductor 130. Therefore the switch node voltage SW_OUT increases to a value almost equal to zero. After the third instance t3 the switch node voltage SW_OUT starts gradually increasing at the third instance t3 due to linear de-energization of the inductor 130. At a fourth instance t4, the switch node voltage SW_OUT equals the first reference voltage $V_{REF1}$. The ZCD comparator 110 changes a ZCD Output signal to HIGH state after a comparator delay time td1. At a fifth instance t5, the gate control circuit 115 changes the NON signal to LOW state. Thus the ZCD comparator 110 identifies a trip point when the inductor current is zero and switches OFF the second switch 125 at the instance.

However, accuracy of the trip point of the ZCD comparator 110 depends on variables such as input supply, output voltage, comparator delay, mismatch in internal reference values, path delays, output inductance of the buck switching regulator 100 and, routing resistance of the buck switching regulator 100. If the trip point occurs before inductor current falls to zero, a positive non-zero current remains in the inductor 130 when the second switch 125 is turned OFF. The remaining inductor current passes through a parasitic diode in the second switch 125 and cause conduction losses. If the trip point occurs after the inductor current cross a zero value, a negative non-zero current remains in the inductor 130 when the second switch 125 is turned OFF. Negative non-zero inductor current during the conduction time of the second switch 125 causes energy loss. The variation of the trip point affects energy efficiency of the buck switching regulator 100.

In light of the foregoing discussion, there is a need for a regulator circuit to control the variations in trip point for switching OFF a power switch in the switching regulator circuit.

SUMMARY

The above mentioned need of an energy efficient switching regulator circuit to control the variations in trip point is met by employing a regulator circuit in the switching regulator.

An example of a switching regulator circuit includes a gate control circuit driving a first switch and a second switch to generate a first voltage at a first node. Moreover, the switching regulator includes an LC filter circuit responsive to the first voltage to generate a desired output voltage. Further, the switching regulator includes a regulator circuit coupled to the LC filter circuit to control the gate control circuit. The regulator circuit accurately controls variations in trip point.

Another example of a regulator circuit for controlling variations in trip point of a switching regulator circuit includes a first comparator operable to receive a first reference signal and a feedback signal to generate a first voltage signal. The first reference signal is a predetermined voltage at a first instance. Further, the regulator circuit includes a second comparator operable to receive a second reference signal and the feedback signal to generate a second voltage signal. The second reference signal is a predetermined voltage at a second instance. Further, the regulator circuit includes a reference delay circuit to delay the first voltage signal by a predetermined time period. Furthermore, the regulator circuit includes a Delay Locked Loop (DLL) to modify a zero current detector output. The DLL includes a Phase Frequency Detector (PFD) operable to receive the delayed first voltage signal and the second voltage signal to output a phase difference signal. The DLL includes a charge pump to generate a control voltage signal based on the phase difference signal. Further, the DLL includes a voltage controlled delay line (VCDL) to generate a delayed zero current detector output based on the control voltage signal, wherein the delayed zero current detector output control the variations in trip point of the switching regulator circuit.

Another example of a regulator circuit for controlling variations in trip point of a switching regulator circuit includes a sample and hold circuit to sample a feedback voltage at a first instance to generate a first voltage signal. Moreover, the regulator circuit includes a Pulse Width Modulation (PWM) controller to control the conduction time of a switch. The PWM controller includes an error amplifier operable to receive the first voltage signal and a first reference signal to generate an error signal. Further, the PWM controller includes a ramp circuit to generate a ramp signal. Moreover, a comparator operable to receive the error signal and the ramp signal to generate a control voltage signal. The control voltage signal controls the variations in trip point of the switching regulator circuit.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

In non-linear DC to DC voltage converters such as buck switching regulators, energy efficiency at light loads depends on timing accuracy of switching off a power switch when inductor current is zero. As a result, the non-linear DC to DC voltage converters require a circuit to ensure accurate timing for the power switch. A zero cross detector comparator is employed in circuits described in prior arts, to ensure timing accuracy of the power switch. However, accuracy of the zero cross detector comparator is dependent on variables such as switch resistance, routing resistance, input supply, output voltage, output inductance, output capacitance and mismatch in internal reference value of the DC to DC voltage converter. Variations in the variables thus affect the timing accuracy of the power switch. A regulator circuit providing a highly accurate timing for the first switch in a DC to DC voltage converter is explained in the following description. In the disclosure the load current of the switching regulator is assumed to be low.

In the present disclosure, relational terms such as first and second, and the like, may be used to distinguish one entity from the other, without necessarily implying any actual relationship or order between such entities. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
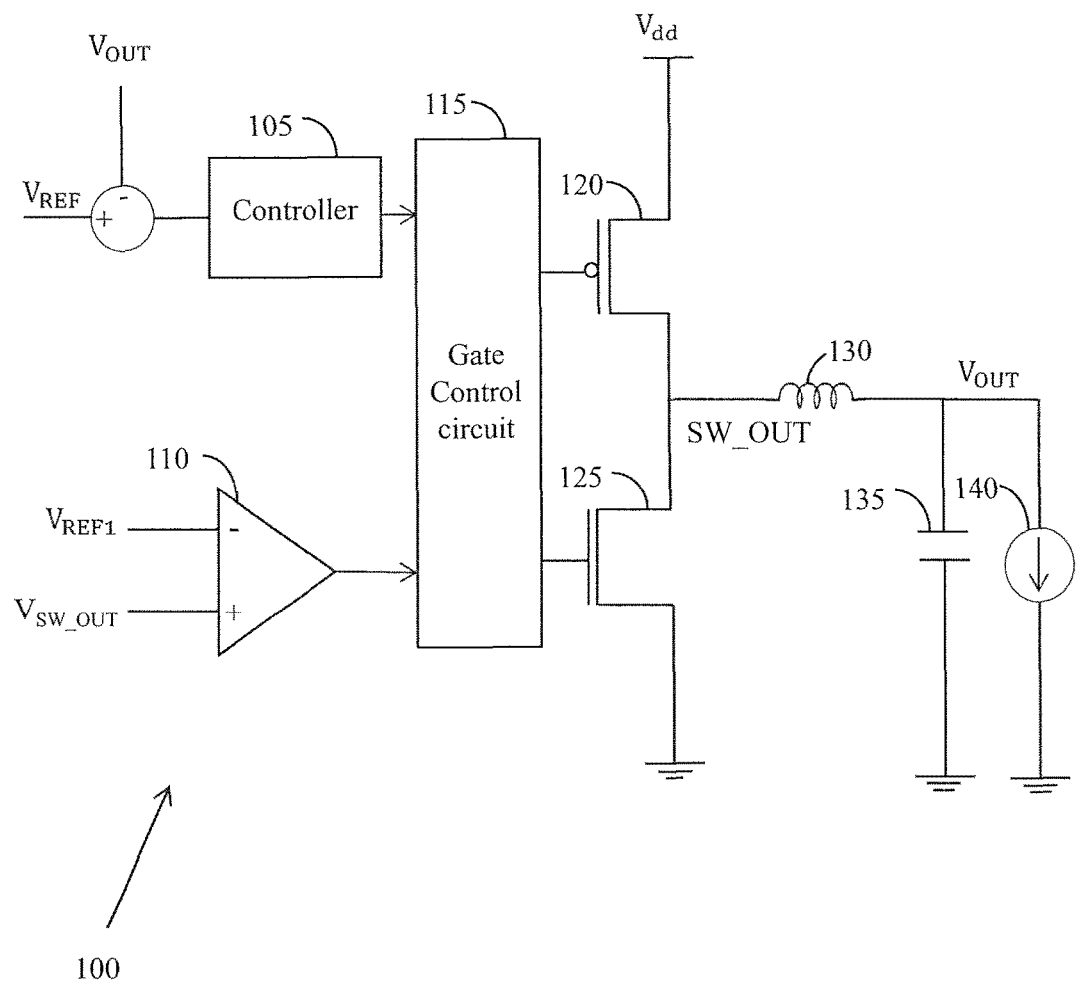
FIG. 1 illustrates a buck switching regulator circuit, in accordance with a prior art.
Figure 2:
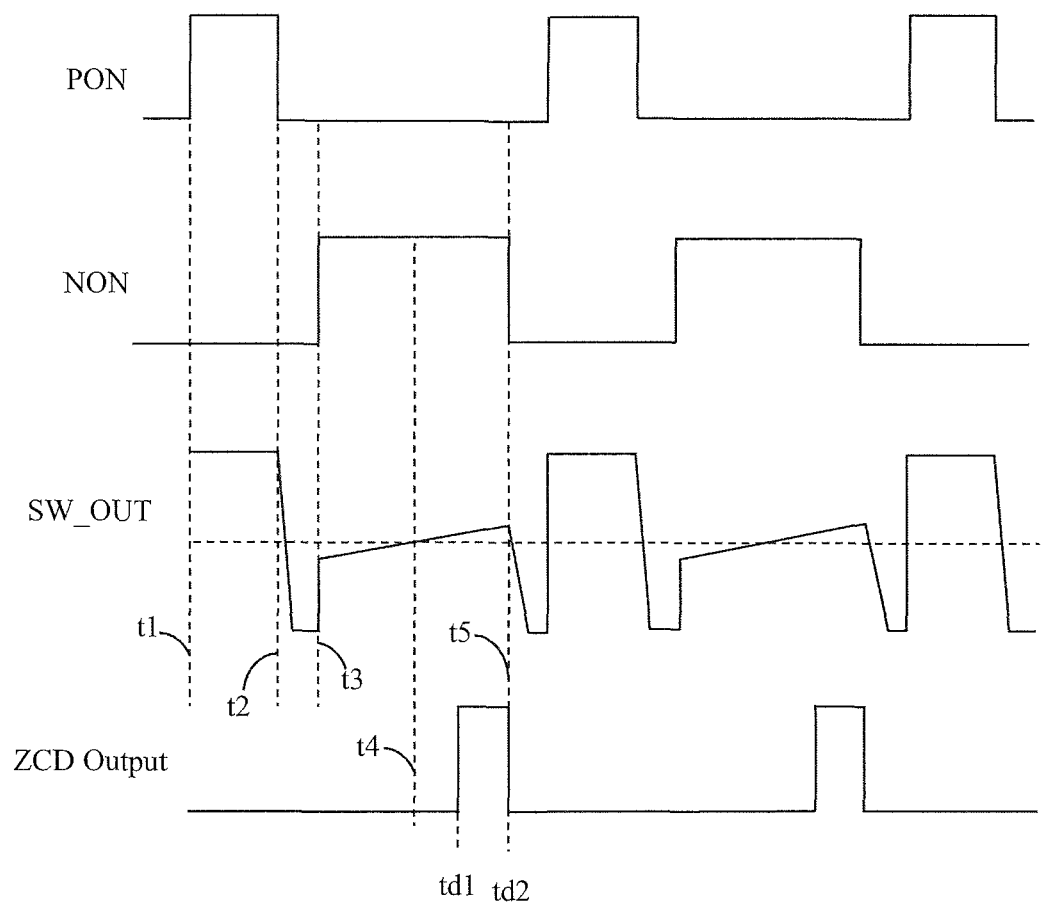
FIG. 2 illustrates variation of a plurality of voltage signals, in accordance with the prior art illustrated in FIG. 1.
Figure 3:
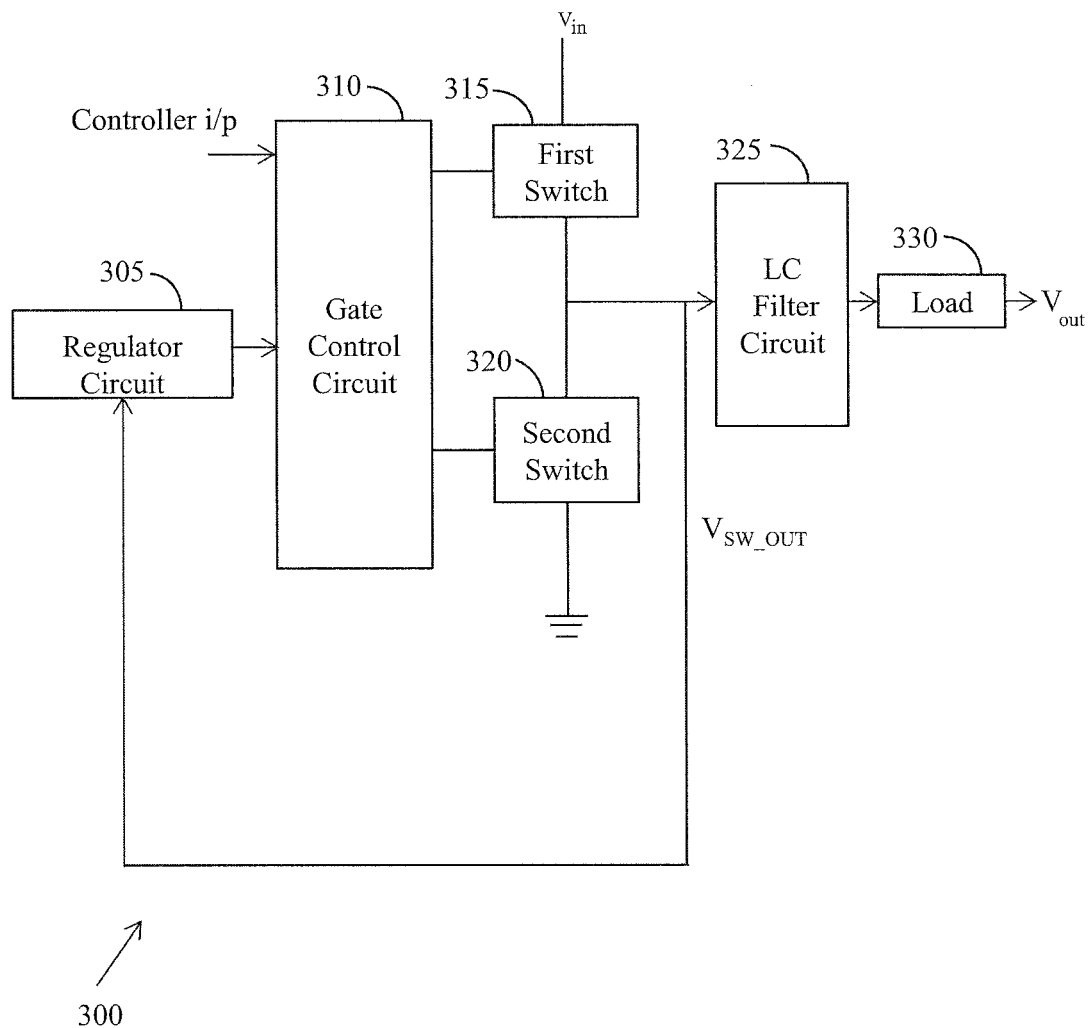
FIG. 3 illustrates a schematic diagram of a buck switching regulator, in accordance with one embodiment of the present invention.

FIG. 3 illustrates a schematic diagram of a buck switching regulator 300 in accordance with one embodiment of the present invention. The buck switching regulator 300 comprises a regulator circuit 305, a gate control circuit 310, a first switch 315, a second switch 320, an LC filter circuit 325, and a load 330. Examples of the first switch 315 include, but are not limited to p-type metal oxide semiconductor field effect transistor (MOSFETs) and n-type MOSFETs. Examples of the second switch 320 include, but are not limited to p-type MOSFETs and n-type MOSFETs. The first switch 315 connects the input supply voltage Vin with the LC filter circuit 325 and the second switch 320. The first switch 315 and the second switch 320 are arranged in push-pull configuration connected at a first node. The gate control circuit 310 controls the first switch 315 and the second switch 320 by supplying control signals to gate inputs of the first switch 315 and the second switch 320.

The gate control circuit 310 is operable to receive a controller input and an input signal from the regulator circuit. The controller input controls the gate control circuit 310 based on duty cycle of the buck switching regulator 300. The duty cycle of the first switch 315 determines magnitude of the output voltage Vout. By switching ON and switching OFF the first switch 315 at a periodic rate, a rectangular waveform is generated at the input of the LC filter circuit 325. An inductor in the LC filter circuit 325 energizes during the conduction time of the first switch 315. The LC filter circuit 325 filters the rectangular waveform to generate the output voltage Vout across the load 330. The gate control circuit 310 switches OFF the first switch 315 after a time period determined by the duty cycle. The inductor de-energizes during the non-conduction time of the first switch 315.

The second switch 320 provides a conduction path for inductor current to flow to ground when switched ON. The inductor current decreases linearly during the conduction time of the second switch 320. The gate control circuit 310 further receives an input signal derived from the feedback signal fed to the regulator circuit 305. The feedback signal is the voltage signal $V_{SW\_OUT}$ at the switch node. The gate control circuit 310 switches OFF the second switch 320 at a trip point. The trip point is the voltage at which the inductor current is equal to zero. The variation in the trip point of the buck switching regulator 300 is regulated by the regulator circuit 305.

The regulator circuit 305 is coupled to the LC filter circuit 325 to control the gate control circuit 310. The regulator circuit 305 controls the gate control circuit 310 to switch OFF the second switch 320 at the trip point. If the trip point occurs before inductor current falls to zero, a positive non-zero inductor current remain in the inductor when the second switch 320 is turned OFF. The remaining inductor current passes through a parasitic diode in the second switch 320 and cause conduction losses. If the trip point occurs after the inductor current cross a zero value, a negative non-zero inductor current remains in the inductor when the second switch 320 is turned OFF. Negative non-zero inductor current during the conduction time of the second switch 320 causes energy loss. Hence, energy efficiency of the buck switching regulator 300 depends on switching OFF the second switch 320 at an accurate trip point.

The regulator circuit 305 accurately controls variations in trip point. The regulator circuit 305 regulates the trip point to align the trip point with the instance when the inductor current is zero. The regulator circuit 305 regulates the trip point with a method comprising sensing an appropriate variable in the buck switching regulator 300 at a first instance. The method includes calculating magnitude of the inductor current at the first instance from the appropriate variable. Further, the method includes calculating difference in the magnitude of the inductor current at the first instance with an internal reference signal. Furthermore the method includes minimizing the difference in the magnitude of the inductor current at the first instance with an internal reference signal. A control loop minimizes the difference with a predetermined loop gain.

Figure 4:
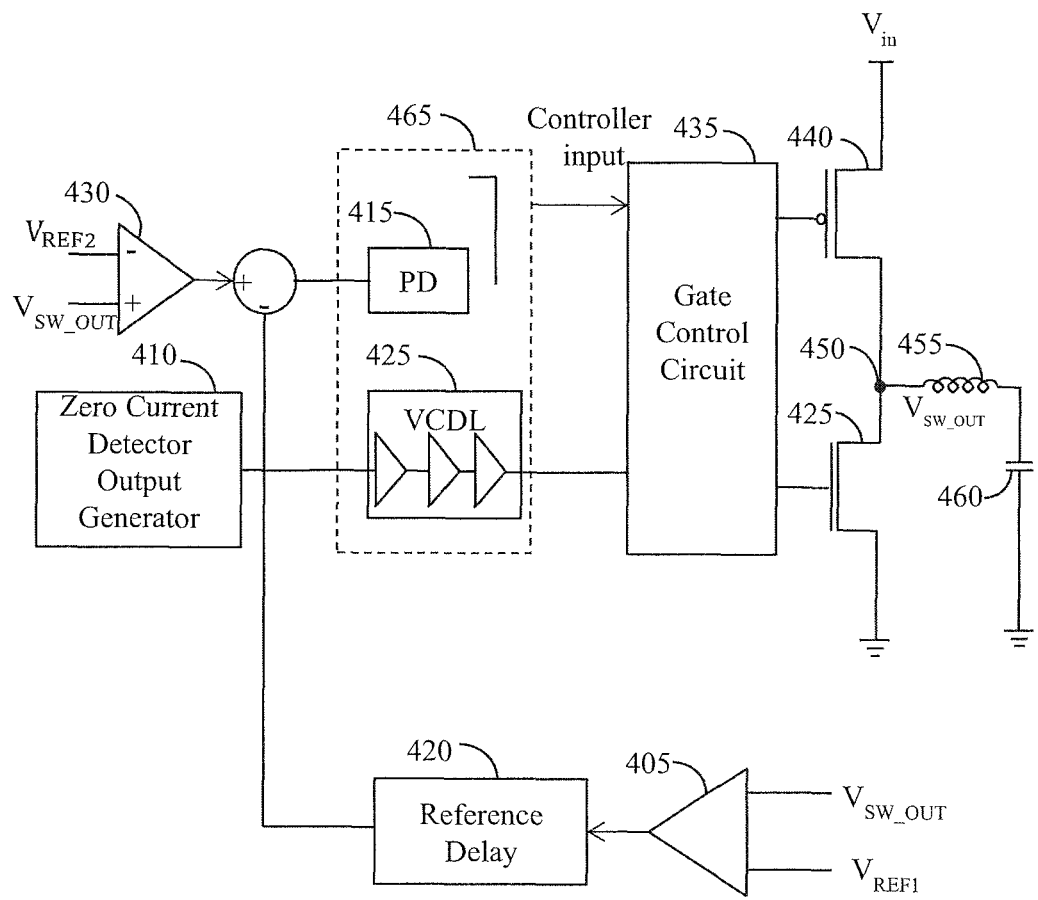
FIG. 4 illustrates a buck switching regulator implementing a delay locked loop, in accordance with an embodiment of the present invention.

FIG. 4 illustrates a buck switching regulator with a delay locked loop, in accordance with one embodiment of the present invention. The buck switching regulator consists of a first comparator 405, a zero current detector output generator 410, a reference delay 420, a second comparator 430, a gate control circuit 435, a first switch 440, a second switch 445, a first node 450, an inductor 455, a capacitor 460, and a delay locked loop 465. The inductor 455 and the capacitor 460 together act as an LC filter circuit.

Examples of the first switch 440 include, but are not limited to p-type MOSFETs and n-type MOSFETs. Examples of the second switch 445 include, but are not limited to p-type MOSFETs and n-type MOSFETs. The first switch 440 connects the input voltage Vin with the LC filter circuit and the second switch 445. The second switch 445 connects the first switch 440 to the ground. The first switch 440 and the second switch 445 are connected at the first node 450. The gate control circuit 435 supplies a first input signal, hereinafter referred to as PON signal to gate input of the first switch 440. Further, the gate control circuit 435 supplies a second input signal, hereinafter referred to as NON signal to the second switch 445. Hence, the gate control circuit 435 controls the switching ON and the switching OFF of the first switch 440 and the second switch 445. By switching ON and switching OFF the first switch 440 at a periodic rate, a rectangular waveform is generated at the input of the LC filter circuit. The rectangular waveform is filtered by the LC filter circuit to generate an output voltage Vout. The inductor 455 in the LC filter circuit energizes during the conduction time of the first switch 440.

After a time interval, the PON signal falls to a LOW state and the gate control circuit 435 switches OFF the first switch 440. The first switch 440 blocks the inductor current flow from the input voltage Vin to the LC filter. The inductor 455 de-energizes during non-conduction time of the first switch 440. Hence, polarity of the voltage across the inductor 455 is reversed. The gate control circuit 435 switches ON the second switch 445. The second switch 445 provides a conduction path for the inductor current to flow to the ground. The inductor current decreases linearly during the conduction time of the second switch 445. Next, the gate control circuit 435 switches OFF the second switch 445 at a trip point.

A regulator circuit regulates the trip point to align the trip point with the instance when the inductor current is zero. The regulator circuit is formed by the first comparator 405, the zero current detector output generator 410, the second comparator 430, the reference delay 420, and the delay locked loop 465.

The first comparator 405 is operable to receive a first reference signal and a feedback signal. The first reference signal is a first predetermined voltage at a first instance. The magnitude of the first reference signal is equal to the voltage when a parasitic diode in the second switch 445 of the switching regulator circuit starts to carry the inductor current. The first reference signal is hereinafter referred to as first reference voltage $V_{REF1}$.

The feedback signal is the voltage signal $V_{SW\_OUT}$ at the first node 450. The feedback signal reaches the first reference voltage $V_{REF1}$ at the first instance. Output of the first comparator 405 shifts to HIGH state at the first instance. The second comparator 430 is operable to receive a second reference signal $V_{REF2}$ and the feedback signal. The second reference voltage $V_{REF2}$ is magnitude of the feedback voltage when damped oscillation commences in the inductor 455 and a parasitic capacitance. The second reference voltage $V_{REF2}$ is positive in polarity. The feedback signal reaches the second reference voltage $V_{REF2}$ at the second instance Output of the second comparator 430 shifts to HIGH state at the second instance. The time difference between the first instance and the second instance capture value of the inductor current in the switching regulator circuit.

The reference delay 420 delays the output of the first comparator 405 by a predetermined time period. The delayed output of the first comparator 405 and output of the second comparator 430 is fed to the delay locked loop 465. The delay locked loop 465 modifies the output of the zero crossing detector depending on the phase difference between the inputs. The delay locked loop 465 includes a phase detector (PD) 415 and a voltage controlled delay line (VCDL) 425. The PD 415 includes a phase frequency detector (PFD) and charge pump circuit (CP). The PD 415 is operable to receive a delayed output of the first comparator 405 and the output of the second comparator 430. The PFD detects phase difference between the outputs of the first comparator 405 and the second comparator 430. The CP generates a control voltage signal proportional to the phase difference between the outputs of the first comparator 405 and the second comparator 430. The zero current detector output generator 410 generates an output pulse to indicate an estimated time when the inductor current through the inductor 455 reaches zero.

However, timing accuracy of the generated output pulse is dependent on variables such as switch resistance, internal routing resistance, input supply, output voltage, output inductance, output capacitance and mismatching in internal reference value of the DC to DC voltage converter. The dependent variables vary with external supply and environmental conditions. As a result, the timing of the output pulse is inaccurate and the output pulse is generated prematurely. The VCDL 425 is operable to receive the output pulse and the control voltage signal as inputs. The VCDL 425 delays the output pulse by a delay amount proportional to the control voltage signal. The output from the VCDL 425 is fed to the gate control circuit 435 to switch OFF the second switch 445 at a trip point. The trip point is an instance when the inductor current flowing through the inductor 455 in the LC filter circuit is equal to zero. The delayed output pulse control the variations in the trip point of the switching regulator circuit.

Figure 5:
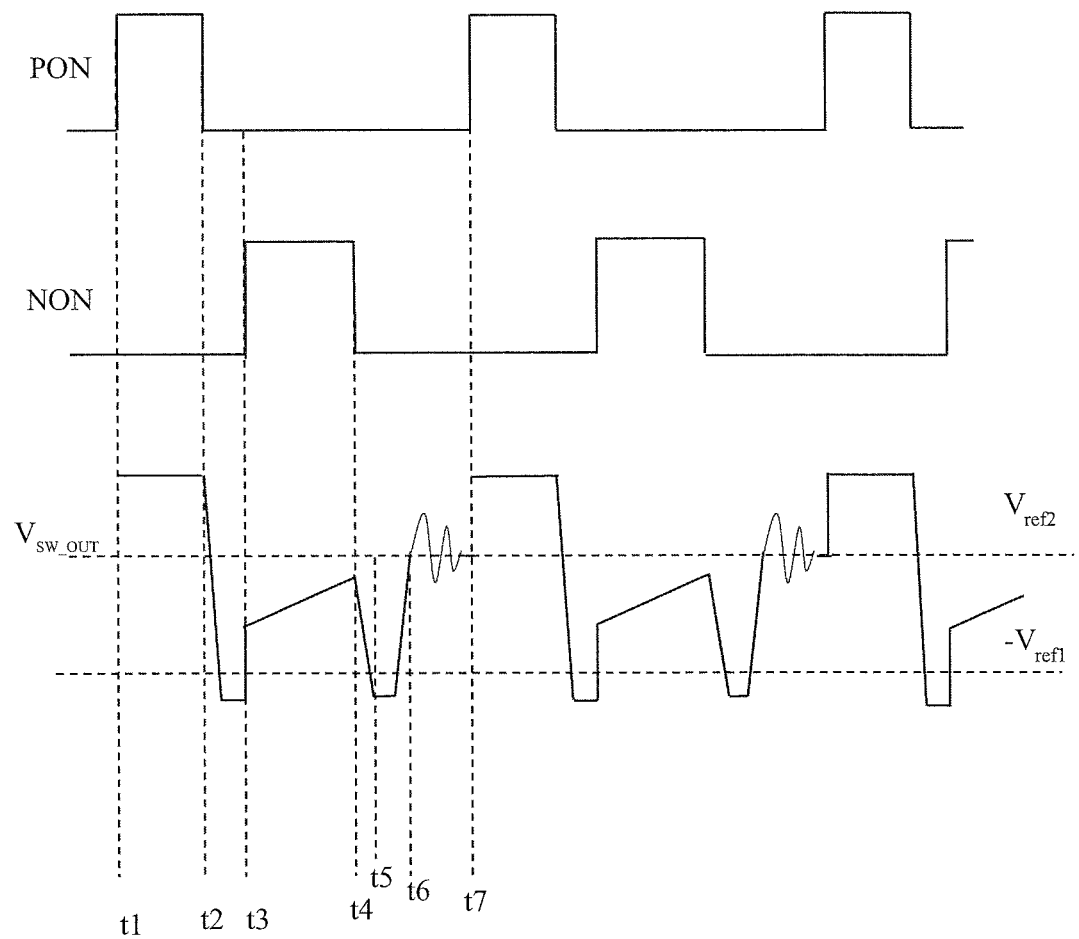
FIG. 5 depicts variation of a plurality of voltage signals, in accordance with the embodiment illustrated in FIG. 4.

The working of the buck switching regulator in FIG. 4 is explained by referring to voltage signal graphs depicted in FIG. 5. Voltage time graphs of the PON signal, the NON signal, and the voltage signal $V_{SW\_OUT}$ is explained in FIG. 5. X axis of the graph indicates time and Y axis of graph indicates voltage. At a first instance t1, the gate control circuit 435 shifts the PON signal to HIGH state, thereby switching ON the first switch 440. The first switch 440 provides a conduction path from input voltage source Vin to ground via the inductor 455 and the capacitor 460. The inductor 455 energizes during the conduction time of the first switch 440. At a second instance t2, the gate control circuit 435 changes the state of PON signal to LOW state. Hence, the first switch 440 switches OFF at the second instance t2. The polarity of the voltage across the inductor 455 reverses and forward biases a parasitic diode in the second switch 445. Thus, the voltage signal $V_{SW\_OUT}$ drops to a negative voltage, the magnitude of the negative voltage being the magnitude of the forward biased voltage of the parasitic diode.

The gate control circuit 435 keeps the PON signal and the NON signal at LOW state during time period between the second instance t2 and a third instance t3. The time between the second instance t2 and the third instance t3 is non-overlap period. The non-overlap period prevents concurrent conduction of the first switch 440 and the second switch 445. As a result, the non-overlap period prevents a short circuit between the input voltage Vin supply and the ground. The gate control circuit 435 switches the NON signal to HIGH state. The second switch 445 starts conducting at the third instance t3. The second switch 445 provides a low resistance conduction path for the inductor current.

The low resistance conduction path generates voltage approximately equal to zero across the second switch 445. Thus the voltage signal $V_{SW\_OUT}$ abruptly increases to a magnitude approximately equal to zero at the third instance t3. However, the polarity of the voltage signal $V_{SW\_OUT}$ is negative. The inductor 455 de-energizes during conduction time of the second switch 445. At a fourth instance t4, the zero current detector output generator 410 sends the output pulse to gate control circuit 435. In response to the output pulse, the gate control circuit 435 switches the state of the NON signal to LOW state. The second switch 445 stops conducting at the fourth instance t4. The parasitic diode in the second switch 445 becomes forward biased at the fourth instance t4. Hence, the voltage signal $V_{SW\_OUT}$ drops to the negative voltage, the magnitude of the negative voltage being the magnitude of the forward biased voltage of the parasitic diode. At a fifth instance t5, the voltage signal $V_{SW\_OUT}$ becomes equal to the first reference voltage $V_{REF1}$. The first comparator 405 generates a first comparator output signal. The reference delay 420 delays the output of the first comparator 405 by a predetermined delay amount. At a sixth instance t6, the voltage signal $V_{SW\_OUT}$ becomes equal to the second reference voltage $V_{REF2}$.

At the sixth instance t6, the second comparator 430 generates a second comparator output signal. In ideal conditions, the gate control circuit 435 switches OFF the second switch 445 at an instance when the inductor current is zero. However, the inaccuracy of zero current detector output generator 410 causes a premature switching OFF of the second switch 445. As a result, the inductor current remains non-zero during the switch OFF of the second switch 445, thereby causing variation in the trip point.

The inductor current forward biases the parasitic diode in the second switch 445. Hence, the voltage signal $V_{SW\_OUT}$ drops to the negative voltage, the magnitude of the negative voltage being the magnitude of the forward biased voltage of the parasitic diode. The voltage signal $V_{SW\_OUT}$ reaches the first reference voltage $V_{REF1}$ and output of the first comparator 405 shifts to HIGH state. The inductor current reduces linearly with the de-energization of the inductor 455. The inductor current reaches a value insufficient to maintain the forward biased condition in the parasitic diode, thereby switching OFF the parasitic diode. The energy stored in a parasitic capacitor and output capacitor 460 causes damped oscillations in the LC filter. In the process, the voltage signal $V_{SW\_OUT}$ rises to a value equal to the second reference voltage $V_{REF2}$ and output of the second comparator 430 shifts to HIGH state. Phase difference between the first comparator output signal and the second comparator output signal indicates the timing error in switching OFF the second switch 445. The PD 415 generates the control voltage signal proportional to the phase difference between the outputs of the second comparator 430 and output of the reference delay 420. The timing error in switching OFF the second switch 445 is minimized by adding correctional delays to the output pulse generated by the zero current detector output generator 410, thereby preventing the premature switching OFF of the second switch 445.

The VCDL 425 is operable to receive the output pulse and the control voltage signal as inputs. The VCDL 425 delays the output pulse by a correctional delay amount proportional to the control voltage signal to generate a delayed output pulse. Hence, timing accuracy of the second switch 445 is improved in the next switching cycle. The timing accuracy reaches a highly accurate value over a period of multiple switching cycles. The gate control circuit 435 shifts the state of PON signal to HIGH state at a seventh instance t7.

Figure 6:
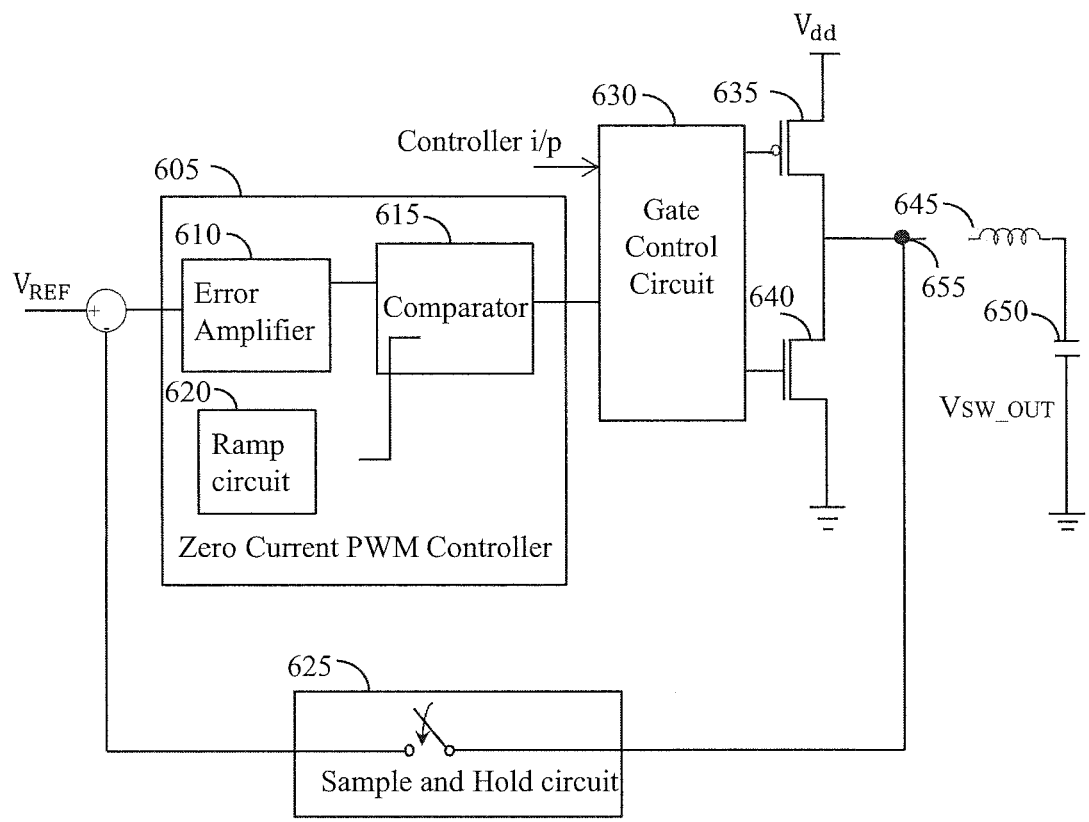
FIG. 6 illustrates a buck switching regulator implementing a pulse width modulation controller, in accordance with another embodiment of the present invention.

FIG. 6 illustrates a buck switching regulator with a pulse width modulation (PWM) controller, in accordance with another embodiment of the present invention. The buck switching regulator consists of a zero current PWM controller 605, a sample and hold circuit 625, a gate control circuit 630, a first switch 635, a second switch 640, an inductor 645, a capacitor 650 and a first node 655.

Examples of the first switch 635 include, but are not limited to p-type MOSFETs and n-type MOSFETs. Examples of the second switch 640 include, but are not limited to p-type MOSFETs and n-type MOSFETs. The first switch 635 connects the input voltage Vdd with an LC filter circuit and the second switch 640. The LC filter circuit is formed by the inductor 645 and the capacitor 650. The second switch 640 connects the first switch 635 to the ground. The first switch 635 and the second switch 640 are connected at the first node 655. The gate control circuit 630 supplies a first input signal, hereinafter referred to as PON signal to gate input of the first switch 635. Further, the gate control circuit 630 supplies a second input signal, hereinafter referred to as NON signal to the second switch 640. Hence, the gate control circuit 630 controls the switching ON and the switching OFF of the first switch 635 and the second switch 640. By switching ON and switching OFF the first switch 635 at a periodic rate, a rectangular waveform is generated at the input of the LC filter circuit. The rectangular waveform is filtered by the LC filter circuit to generate an output voltage Vout. The inductor 645 in the LC filter circuit energizes during the conduction time of the first switch 635.

After a time interval, the PON signal falls to a LOW state and the gate control circuit 630 switches OFF the first switch 635. The first switch 635 blocks the inductor current flow from the input voltage Vdd to the LC filter. The inductor 645 de-energizes during non-conduction time of the first switch 635. The gate control circuit 630 switches ON the second switch 640. The second switch 640 provides a conduction path for the inductor current to flow to the ground. The inductor current decreases linearly during the conduction time of the second switch 640.

Next, the gate control circuit 630 switches OFF the second switch 640 after a regulated time period at a trip point. If the trip point occurs before inductor current falls to zero, a positive non-zero current remain in the inductor 645 when the second switch 640 is turned OFF. The remaining inductor current passes through a parasitic diode in the second switch 640 and cause conduction losses. If the trip point occurs after the inductor current cross a zero value, a negative non-zero current remains in the inductor 645 when the second switch 640 is turned OFF. Negative non-zero inductor current during the conduction time of the second switch 640 causes energy loss. Hence, energy efficiency of the buck switching regulator depends on alignment of the trip point to an instance when the inductor current is zero.

A regulator circuit regulates the trip point to align the trip point with the instance when the inductor current is zero. The regulator circuit is formed by the zero current PWM controller 605, and the sample and hold circuit 625. The regulator circuit regulates the trip point with a method comprising sensing a voltage signal $V_{SW\_OUT}$. The method includes calculating magnitude of the inductor current at the first instance from the voltage signal $V_{SW\_OUT}$. Further, the method includes calculating difference in the magnitude of the inductor current from zero current. Furthermore, the method includes minimizing the difference in the magnitude of the inductor current at the first instance from zero current with a control loop with a predetermined loop gain.

The zero current PWM controller 605 is operable to receive an internal reference voltage Vref and the output of the sample and hold circuit 625. The internal reference voltage Vref is the voltage across the second switch 640 when inductor current through the inductor 645 is zero. The zero current PWM controller 605 comprises an error amplifier 610, a ramp circuit 620, and a comparator 615.

The error amplifier 610 is operable to receive the internal reference voltage signal Vref and the output of the sample and hold circuit 625. The error amplifier 610 generates an error signal equal to the difference between the output of the sample and hold circuit 625 and the internal reference Vref. The ramp circuit 620 generates a ramp signal changing linearly at a constant rate. The comparator 615 is operable to receive the output of the error amplifier 610 and the ramp circuit 620.

The comparator 615 generates a comparator output signal, when the ramp signal of the ramp circuit 620 equals the output of the error amplifier 610. Hence, time taken by the comparator 615 to generate the comparator output signal depends on the output of the error amplifier 610. The gate control circuit 630 is operable to receive a controller input voltage signal and a regulation voltage signal. The gate control circuit 630 supplies gating signals to the first switch 635 and a second switch 640.

The gate control circuit 630 supplies a first input signal PON to gate input of the first switch 635 and a second input signal NON to the second switch 640. As a result, the gate control circuit 630 controls the switching ON and the switching OFF of the first switch 635 and the second switch 640. The inductor 645 and the capacitor 650 forms a LC filter circuit. The first node 655 connects the inductor 645, the first switch 635 and the second switch 640. The sample and hold circuit 625 is operable to receive the voltage signal $V_{SW\_OUT}$ from the first node 655.

Figure 7:
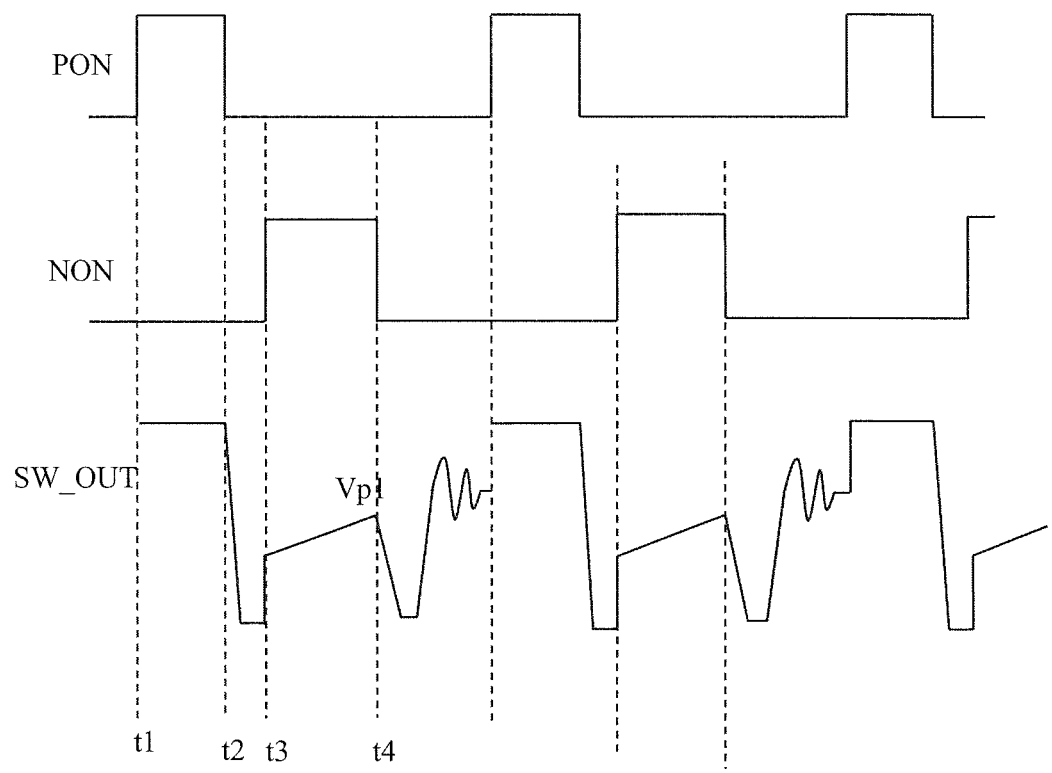
FIG. 7 depicts variation of a plurality of voltage signals, in accordance with the embodiment illustrated in FIG. 6.

The working of the buck switching regulator in FIG. 6 is explained by referring to voltage signal graphs depicted in FIG. 7. Voltage time graphs of the PON signal, the NON signal, and the voltage signal $V_{SW\_OUT}$ is explained with reference to FIG. 7. X axis of the graph indicates time and Y axis of graph indicates voltage. At a first instance t1, the gate control circuit 630 changes the PON signal to HIGH state. The PON signal switches ON the first switch 635, and the first switch 635 provides a conduction path from input voltage Vdd to ground via the inductor 645 and the capacitor 650. The inductor 645 energizes during the conduction time of the first switch 635.

At a second instance t2, the gate control circuit 630 changes the state of PON signal to LOW state. Hence, the first switch 635 switches OFF at the second instance t2. As a result, the inductor 645 starts de-energizing and the polarity of voltage across the inductor 645 is reversed. A parasitic diode in the second switch 640 gets forward biased and conducts inductor current to the ground. Thus, the voltage signal $V_{SW\_OUT}$ drops to a negative voltage, the magnitude of the negative voltage being the magnitude of the forward biased voltage of the parasitic diode. The gate control circuit 630 keeps the PON signal and the NON signal at LOW state during time period between the second instance t2 and a third instance t3. The time between the second instance t2 and the third instance t3 is non-overlap period. The non-overlap period prevents concurrent conduction of the first switch 635 and the second switch 640. As a result, the non-overlap period prevents a short between the input voltage Vdd supply and the ground.

At the third instance t3, the gate control circuit 630 changes the NON signal to HIGH state. The second switch 640 starts conducting at the third instance t3. The second switch 640 provides a LOW resistance conduction path for the inductor current. The low resistance conduction path generates voltage approximately equal to zero across the second switch 640. Hence, the voltage signal $V_{SW\_OUT}$ abruptly increases to a magnitude approximately equal to zero at the third instance t3. However, the polarity of the voltage signal $V_{SW\_OUT}$ is negative. The inductor current decreases linearly during conduction time of the second switch 640. Hence, the voltage signal $V_{SW\_OUT}$ increases linearly during conduction time of the second switch 640. At a fourth instance t4, the voltage signal $V_{SW\_OUT}$ becomes equal to the internal reference Vref. At this point, the zero current PWM controller 605 provides a signal to the gate control circuit 630 to turn off the second switch 640. The internal reference voltage Vref corresponds to the value of the voltage signal $V_{SW\_OUT}$ when the inductor current is zero. However, the timing accuracy of switching OFF the switch 640 is dependent on variables such as delay in the gate control circuit 630 and comparator delay. Variations in the variables affect the time accuracy of the trip point.

Conduction time of the second switch 640 is adjusted to be equal to the time taken for the inductor current to reach zero. The internal reference voltage Vref is the voltage across the second switch 640, when inductor current through the inductor 645 is zero. If the magnitude of the voltage signal $V_{SW\_OUT}$ at the fourth instance t4 is greater than the internal reference voltage Vref, the conduction time of the second switch 640 was shorter than desired time. If the magnitude of the voltage signal $V_{SW\_OUT}$ at the fourth instance t4 is greater than the internal reference voltage Vref, the inductor 645 rate of de-energization of the inductor 645 is greater than the ideal rate. If the magnitude of the voltage signal $V_{SW\_OUT}$ at the fourth instance t4 is greater than the internal reference voltage Vref, the conduction time of the second switch 640 was longer than desired time. The conduction time of the second switch 640 is controlled by the zero current PWM controller 605.

The sample and hold circuit 625 samples the voltage signal $V_{SW\_OUT}$ when the second switch 640 is switched OFF. The error amplifier 610 generates an error signal equal to the difference between the output of the sample and hold circuit 625 and the internal reference voltage Vref. The ramp circuit 620 generates a ramp signal. The comparator 615 is operable to receive the error signal from the error amplifier 610 and the ramp signal from the ramp circuit 620. The comparator 615 generates a comparator output signal when magnitude of the ramp signal reaches magnitude of the error signal. Hence, time taken by the comparator 615 to generate the comparator output signal depends on the error signal from the error amplifier 610. The comparator output signal is supplied to the gate control circuit 630 to control the conduction time of the second switch 640. As a result, the conduction time of the second switch 640 is regulated. Hence, the present invention improves the timing accuracy of conduction time of the second switch 640.

Advantageously the embodiments specified in the present invention improve the timing accuracy of the conduction times of a second switch in a switching regulator. Unlike the existing prior arts, the present invention takes into account the variables such as output inductance, switch resistance, internal routing resistance, input supply, output voltage, mismatching in internal reference values of the DC to DC voltage converter, path delays affecting timing accuracy of the conduction times of a second switch in a switching regulator. As a result, the present invention enhances the energy efficiency of the switching regulator. The circuit configuration allows a fairly accurate timing for conduction times of the second switch, over process, voltage and temperature variation.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

What is claimed is:

1. A regulator circuit for controlling variations at a trip point of a switching regulator circuit, the regulator circuit comprising:
   a first comparator operable to receive a first reference signal and a feedback signal to generate a first voltage signal, wherein the first reference signal is a first predetermined voltage at a first instance and the feedback signal is a voltage across a switch;
   a second comparator operable to receive a second reference signal and the feedback signal to generate a second voltage signal, wherein the second reference signal is a second predetermined voltage at a second instance, wherein difference in time between the first instance and the second instance is proportional to value of an inductor current in the switching regulator circuit;
   a reference delay circuit to delay the first voltage signal by a predetermined time period; and
   a Delay Locked Loop (DLL) to modify a zero current detector output, the DLL comprising:
      a Phase Frequency Detector (PFD) operable to receive the first voltage signal delayed and the second voltage signal to output a phase difference signal;
      a charge pump to generate a control voltage signal based on the phase difference signal; and
      a voltage controlled delay line (VCDL) to generate a delayed zero current detector output based on the control voltage signal, wherein the delayed zero current detector output controls variations in a trip point of the switching regulator, wherein the trip point is an instance at which the inductor current flowing in the switching regulator circuit is equal to zero.

2. The regulator circuit as claimed in claim 1, wherein the first predetermined voltage is equal to a voltage of the parasitic diode when the parasitic diode starts conducting the inductor current.

3. The regulator circuit as claimed in claim 1, wherein the second reference signal is magnitude of the feedback voltage when damped oscillation commences in an inductor and a parasitic capacitance.

* * * * *